United States Patent
Wu et al.

(10) Patent No.: US 9,054,792 B2
(45) Date of Patent: Jun. 9, 2015

(54) ELECTRONIC DEVICE CAPABLE OF ELIMINATING WIRELESS SIGNAL INTERFERENCE

(71) Applicant: HON HAI PRECISION INDUSTRY CO., LTD., New Taipei (TW)

(72) Inventors: Jen-Chieh Wu, New Taipei (TW); Shii-Rong Den, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 43 days.

(21) Appl. No.: 13/925,098

(22) Filed: Jun. 24, 2013

(65) Prior Publication Data
US 2014/0295768 A1     Oct. 2, 2014

(30) Foreign Application Priority Data
Mar. 29, 2013 (TW) .............................. 102111544 A

(51) Int. Cl.
*H04B 1/00*     (2006.01)
*H04B 15/00*     (2006.01)

(52) U.S. Cl.
CPC ..................................... *H04B 15/00* (2013.01)

(58) Field of Classification Search
USPC ................ 455/3.05, 41.2, 63.1, 63.4, 76, 86, 455/234.1, 426.1, 552.1
See application file for complete search history.

(56) References Cited

U.S. PATENT DOCUMENTS

| | | | |
|---|---|---|---|
| 4,566,013 A | 1/1986 | Steinberg et al. | |
| 5,887,247 A | 3/1999 | Baltus et al. | |
| 8,498,574 B2* | 7/2013 | Beninghaus et al. | 455/63.1 |
| 2002/0193071 A1 | 12/2002 | Waltho | |
| 2005/0069063 A1 | 3/2005 | Waltho et al. | |
| 2011/0164526 A1* | 7/2011 | Zhu et al. | 370/252 |

FOREIGN PATENT DOCUMENTS

CN      1137843      12/1996

* cited by examiner

*Primary Examiner* — Tuan H Nguyen
(74) *Attorney, Agent, or Firm* — Novak Druce Connolly Bove + Quigg LLP

(57) ABSTRACT

An electronic device eliminating wireless signal interference includes a first radio unit, a second radio unit, and a quadrature coupler. The first radio unit includes a first antenna and a first transceiver. The first transceiver is configured to output first wireless signals via a first port. The second radio unit operates on a same frequency of the first radio unit, and includes a second antenna and a second transceiver. The second transceiver is configured to output second wireless signals via a second port. The quadrature coupler is connected to the first and the second ports, configured to separate the first wireless signals from the second wireless signals, and further to cause a first radiation field pattern of the first wireless signals to be orthogonal with a second radiation field pattern of the second wireless signals.

8 Claims, 2 Drawing Sheets

ELECTRONIC DEVICE CAPABLE OF ELIMINATING WIRELESS SIGNAL INTERFERENCE

BACKGROUND

1. Technical Field

The present disclosure relates to electronic devices, and particularly to an electronic device capable of eliminating wireless signal interference.

2. Description of Related Art

Different wireless signals may interfere with each other. For example, when a Bluetooth module and a WIFI module simultaneously operate in a single electronic device, signals transmitted from the Bluetooth module and the WIFI module may interfere with each other. Therefore, what is needed is a means to solve the problem described above.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Figure 1:
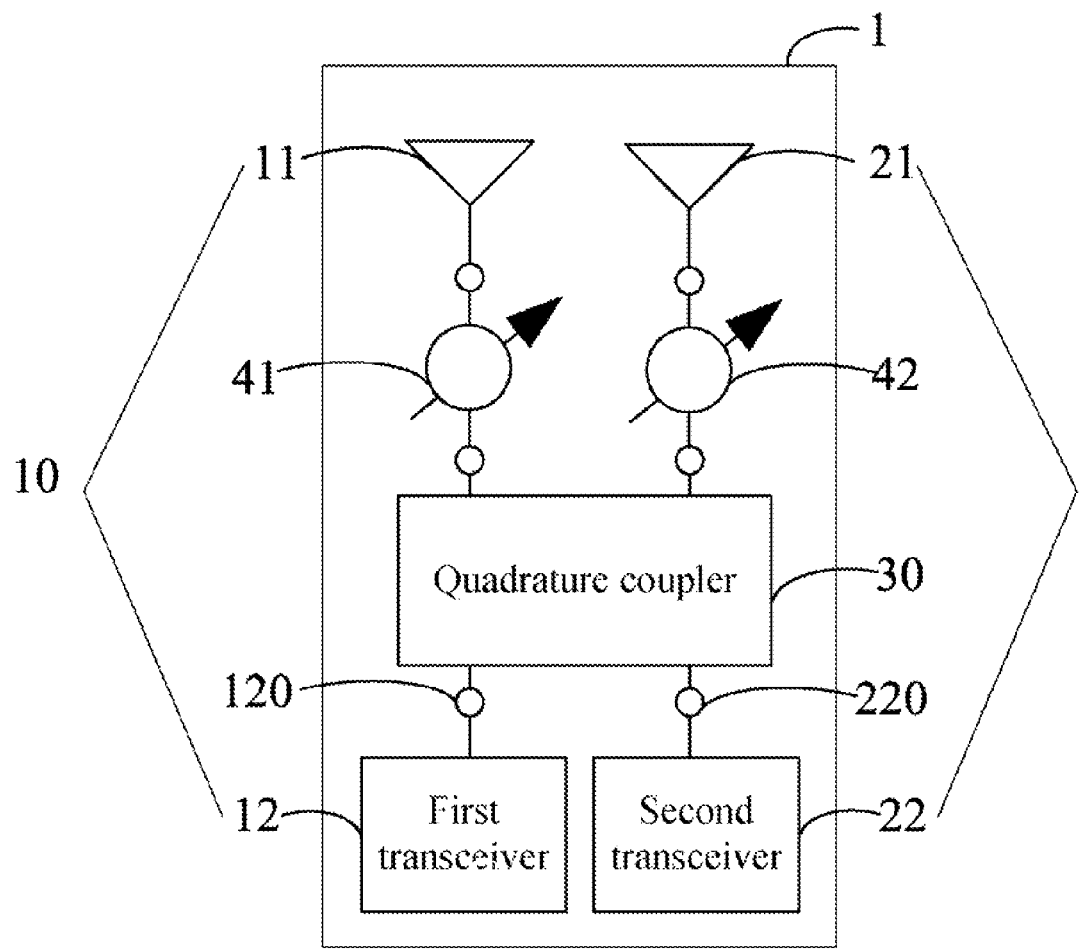
FIG. 1 is a block diagram of an electronic device capable of eliminating wireless signal interference, in accordance with an exemplary embodiment.

FIG. 1 illustrates a block diagram of an embodiment of an electronic device 1 capable of eliminating wireless signal interference. The electronic device 1 may be a mobile terminal or a tablet computer.

The electronic device 1 includes a first radio unit 10 and a second radio unit 20. The first and the second radio units 10, 20 operate on a same or similar frequency. The first radio unit 10 includes a first antenna 11 and a first transceiver 12. The second radio unit 20 includes a second antenna 21 and a second transceiver 22. In the embodiment, the first radio unit 10 is a Bluetooth unit, and the second radio unit 20 is a WIFI unit. In the embodiment, the first and the second antennas 11, 21 are array antennas.

The electronic device 1 further includes a quadrature coupler 30, a first bidirectional phase-shifter 41, and a second bidirectional phase-shifter 42. The quadrature coupler 30 is connected to a first port 120 of the first transceiver 12, and a second port 120 of the second transceiver 22. The first bidirectional phase-shifter 41 is connected between the first antenna 11 and the quadrature coupler 30. The second bidirectional phase-shifter 42 is connected between the second antenna 21 and the quadrature coupler 30.

Figure 2:
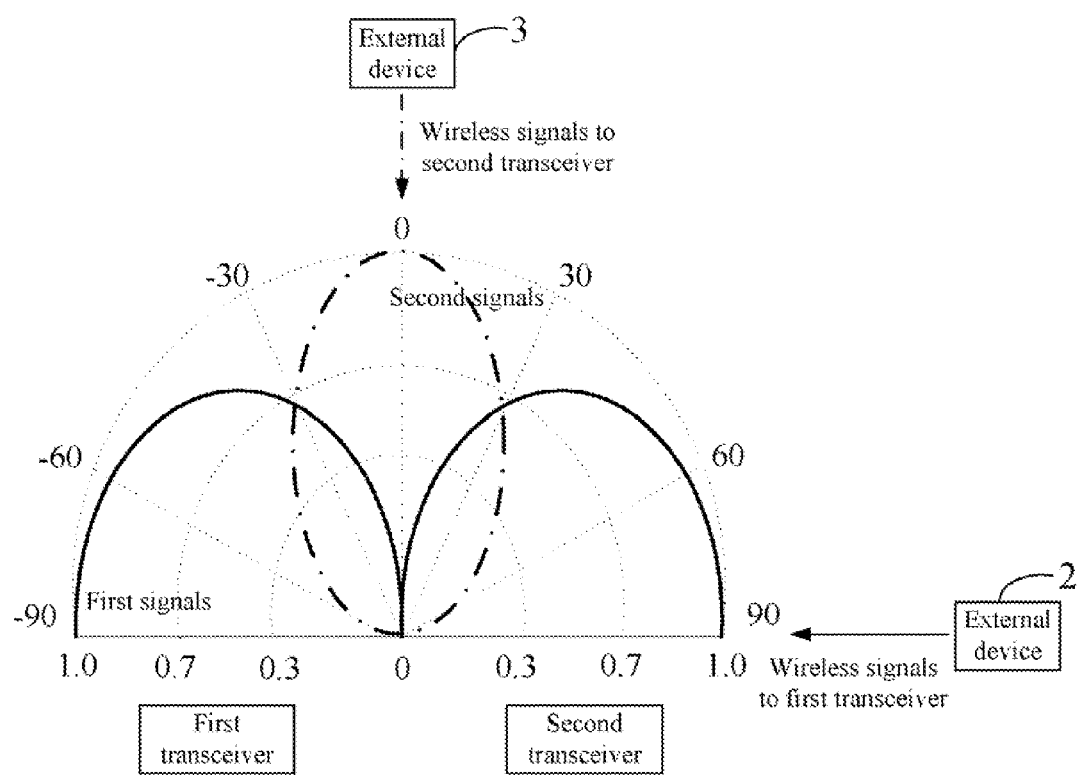
FIG. 2 is a perspective view of radiation field patterns radiated by a quadrature coupler included in the electronic device of FIG. 1.

Referring also to FIG. 2, the quadrature coupler 30 separates first wireless signals generated by the first transceiver 12 from second wireless signals generated by the second transceiver 22, thus the first wireless signals and the second wireless signals cannot interfere with each other. The quadrature coupler 30 further causes causing the first radiation field pattern of the first wireless signals (shown in solid line) to be orthogonal with the second radiation field pattern of the second wireless signals (shown in dotted line). When the first radiation field pattern is orthogonal with the second radiation field pattern, the electronic device 1 may not be interfered with by external devices which radiation field patterns of wireless signals are orthogonal with each other.

In detail, taking two external devices 2, 3 respectively outputs two wireless signals to the first and the second transceivers 12, 22 for example. In FIG. 2, two different arrows are employed to indicate radiation directions of the orthogonal radiation field patterns of the two wireless signals. When the first radiation field pattern of the electronic device 1 and radiation field pattern of the external device 2 to the first transceiver 12 have a same or similar radiation direction, the first radiation field pattern and the radiation field pattern of the external device 3 to the second transceiver 22 are nearly orthogonal with each other. In such situation, wireless signals from the external device 2 can be transmitted to the first transceiver 12 without interference from wireless signals from the external device 3 to the second transceiver 22. Similarly, when the second radiation field pattern of the electronic device 1 and the radiation field pattern of the external device 3 to the second transceiver 22 have a same or similar radiation direction, wireless signals from the external device 3 can be transmitted to the second transceiver 22 without interference from wireless signals between the external device 2 to the first transceiver 12.

Each of the first and the second bidirectional phase-shifters 41, 42 adjust the radiation directions of the first and the second radiation fields from the quadrature coupler 30 by phase adjustment whilst the phase of the first radiation field keeps orthogonal with that of the second radiation field, to allow the first radiation field pattern to be orthogonal with the radiation field pattern from the external device to the second transceiver 22, and the second radiation field pattern to be orthogonal with the radiation field pattern from the external device to the first transceiver 12, when the external device is at any arbitrary location. Then, interference from the external device can be eliminated. In the embodiment, the first and the second bidirectional phase-shifters 41, 42 can adjust the radiation directions of the first and the second radiation fields within a range of 0 degrees to 180 degrees, thereby changing radiation directions of the first and the second radiation fields 360 degrees.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device capable of eliminating wireless signal interference, comprising:
   a first radio unit comprising:
      a first antenna; and
      a first transceiver configured to output first wireless signals via a first port thereof;
   a second radio unit operating on a same frequency of the first radio unit, and comprising;
      a second antenna; and
      a second transceiver configured to output second wireless signals via a second port thereof; and
   an quadrature coupler connected to the first and the second ports, configured to separate the first wireless signals from the second wireless signals, and further to cause a first radiation field pattern of the first wireless signals to be orthogonal with a second radiation field pattern of the second wireless signals; and a first bidirectional phase-shifter and a second bidirectional phase-shifter, wherein the first bidirectional phase-shifter is connected between the first antenna and the quadrature coupler, the second bidirectional phase-shifter is connected between the second antenna and the quadrature coupler, each of the first and the second bidirectional phase-shifter is configured to adjust radiation directions of the first and the second radiation fields from the quadrature coupler by phase adjustment whilst the phase of the first radiation field keeps orthogonal with that of the second radiation field, to allow the first radiation field pattern to be orthogonal with a radiation field pattern from an external device to the second transceiver, and the second radiation field pattern to be orthogonal with a radiation field pattern from another external device to the first transceiver, when the external device is at any arbitrary location.

2. The electronic device of claim 1, wherein the first radio unit is a Bluetooth unit, and the second radio unit is a WIFI unit.

3. The electronic device of claim 1, wherein the first and the second antennas are array antennas.

4. The electronic device of claim 1, wherein the first and the second bidirectional phase-shifters are configured for adjusting the radiation directions of the first and the second radiation fields within a range of 0 degrees to 180 degrees, thereby changing the radiation directions of the first and the second radiation fields 360 degrees.

5. An electronic device capable of eliminating wireless signal interference, comprising:
   a first radio unit comprising;
      a first antenna; and
      a first transceiver configured to output first wireless signals via a first port thereof;
   a second radio unit operating in a same frequency of the first radio unit, and comprising;
      a second antenna; and
      a second transceiver configured to output second wireless signals via a second port thereof;
   an quadrature coupler connected to the first and the second ports, configured to separate the first wireless signals from the second wireless signals, and further to cause a first radiation field pattern of the first wireless signals to be orthogonal with a second radiation field pattern of the second wireless signals;
   a first bidirectional phase-shifter connected between the first antenna and the quadrature coupler; and
   a second bidirectional phase-shifter connected between the second antenna and the quadrature coupler;
   wherein each of the first and the second bidirectional phase-shifter is configured to adjust radiation directions of the first and the second radiation fields from the quadrature coupler by phase adjustment whilst the phase of the first radiation field keeps orthogonal with that of the second radiation field, to allow the first radiation field pattern to be orthogonal with a radiation field pattern from an external device to the second transceiver, and the second radiation field pattern to be orthogonal with a radiation field pattern from another external device to the first transceiver, when the external device is at any arbitrary location.

6. The electronic device of claim 5, wherein the first radio unit is a Bluetooth unit, and the second radio unit is a WIFI unit.

7. The electronic device of claim 5, wherein the first and the second antennas are array antennas.

8. The electronic device of claim 5, wherein the first and the second bidirectional phase-shifters are configured for adjusting the radiation directions of the first and the second radiation fields within a range of 0 degrees to 180 degrees, thereby changing the radiation directions of the first and the second radiation fields 360 degrees.

* * * * *